Nov. 1, 1949   C. W. WATSON   2,486,894
PROCESS FOR CATALYTIC CONVERSION OF CARBON OXIDES
Filed Nov. 2, 1945
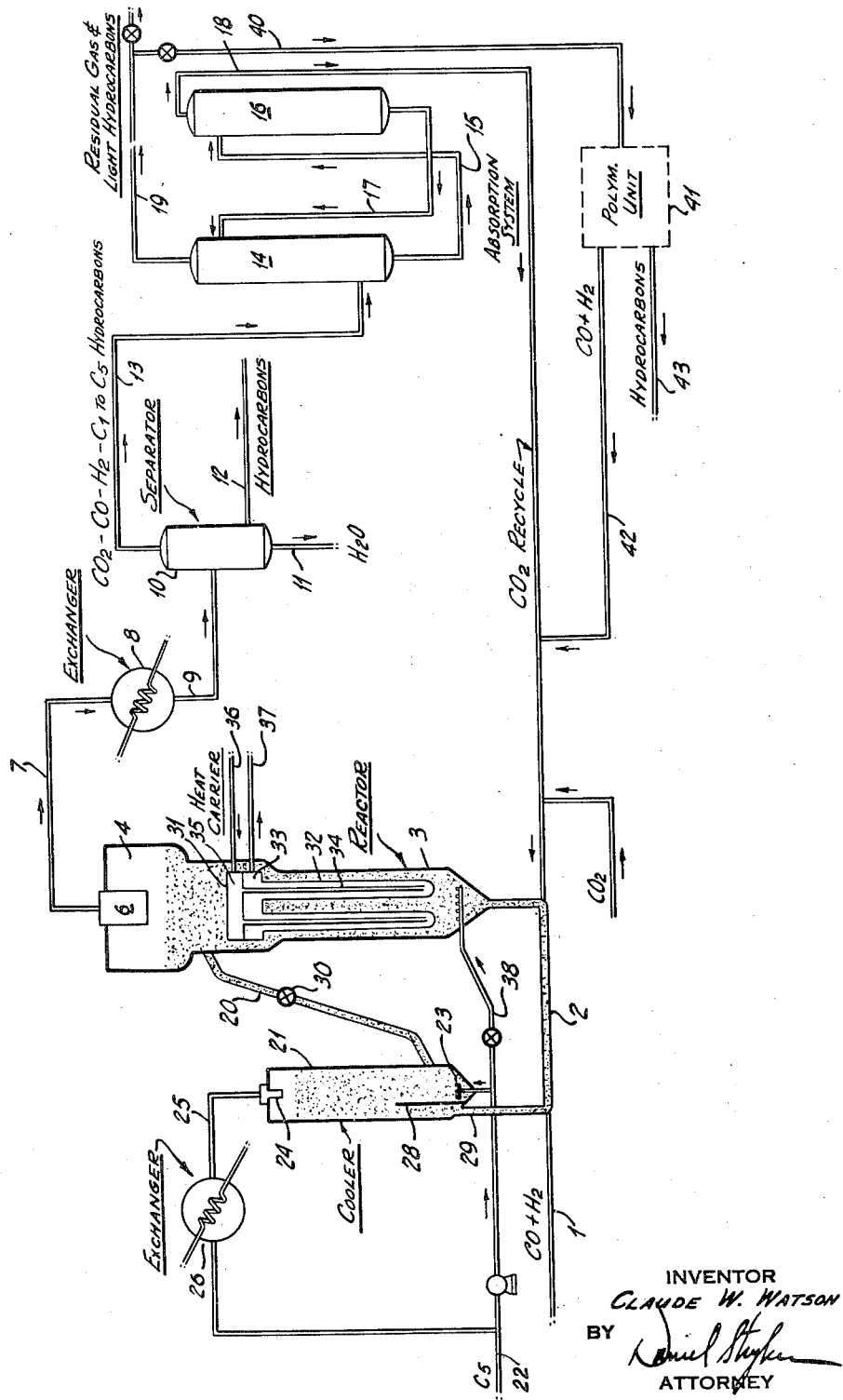
INVENTOR
CLAUDE W. WATSON
BY
ATTORNEY Patented Nov. 1, 1949

2,486,894

UNITED STATES PATENT OFFICE 2,486,894

PROCESS FOR CATALYTIC CONVERSION OF CARBON OXIDES

Claude W. Watson, Scarsdale, N. Y., assignor to The Texas Company, New York, N. Y., a corporation of Delaware Application November 2, 1945, Serial No. 626,425

3 Claims. (Cl. 260—449.6)

This invention relates to the catalytic conversion of carbon monoxide and hydrogen into hydrocarbons, oxygenated hydrocarbons and the like.

In accordance with the invention, synthesis gas containing carbon monoxide and hydrogen is subjected to contact with a synthesis catalyst in the presence of added or recycled carbon dioxide under conditions such that there is at least a substantial reduction in net production of carbon dioxide from the conversion and also such that there is substantial reduction in the production of methane. The amount of carbon dioxide added to the reaction zone and the temperature conditions within the reaction zone are regulated to bring about this reduction in production of carbon dioxide and methane with a consequently greater conversion of available carbon in the synthesis feed gas into valuable products.

More specifically, the invention contemplates effecting initial contact between synthesis feed gas and the catalyst at a substantially lower temperature than that prevailing during subsequent or final contact between reactants and catalyst within the reaction zone or zones. The catalyst particle temperature at the point of initial contact is advantageously about 50° F. lower and may range from at least 10 to 100° F. lower than the catalyst temperature at the point of final contact.

In addition to maintaining a temperature gradient or differential throughout the reaction zone, carbon dioxide is added thereto so that the ratio of mols of hydrogen to mols of both carbon monoxide and carbon dioxide passing to the reaction zone does not exceed 1 and preferably is not less than about 0.6. It is advantageous to operate with this ratio at 1 or just below, and this is possible provided the aforesaid temperature of initial contact is maintained sufficiently low.

From the standpoint of obtaining at least 95% conversion of carbon monoxide into valuable products, it is preferred to use a powdered synthesis catalyst in a state of dense phase fluidization within a vertical reaction zone through which the reactants rise under conditions of flow effective for fluidization of the catalyst mass.

Synthesis gas as obtained heretofore has frequently contained small amounts of carbon dioxide which has been regarded merely as an inert diluent. However, the concept of deliberately incorporating carbon dioxide in substantial amount in the synthesis gas or adding it to the synthesis reaction in order to obtain a beneficial result has been contrary to the usual beliefs. I have found that the addition of sufficient carbon dioxide to the reaction, providing other conditions of operation are maintained, unexpectedly results in inhibiting net production of carbon dioxide and also materially reduces the production of methane.

The invention has particular application when effecting the synthesis reaction with a fluidized powdered synthesis catalyst for the production of hydrocarbons, including gasoline hydrocarbons. In carrying out the conversion, synthesis gas containing carbon monoxide and hydrogen in predetermined proportions is continuously introduced to the lower portion of a vertical reaction vessel containing a mass of catalyst comprising, for example, iron powder of about 100 to 400 mesh and having such particle size distribution as to assure maintaining uniform fluidization along the vertical dimension of the reactor. The reactant gas is caused to rise through the mass under conditions of flow sufficient to maintain the catalyst in a state of dense phase fluidization such as described, for example, in the Odell Patent No. 1,984,380.

The fluidized catalyst is maintained under elevated temperature and pressure such that substantial conversion of carbon monoxide into hydrocarbons occurs, the resulting products of reaction including unreacted gas being discharged from the upper portion of the reaction zone.

Since the reaction is of a highly exothermic nature, provision is made for removing the heat of reaction from the reaction zone. This may be accomplished by providing tubular heat exchange surfaces within the fluidized catalyst mass through which a suitable heat carrier fluid is circulated in indirect heat exchange relationship with the fluidized catalyst. Part of the temperature regulation may be effected by injection of an atomized liquid vaporizable under the conditions of temperature and pressure prevailing within the reaction zone.

By way of illustration, a synthesis gas containing carbon monoxide and hydrogen is passed to a reaction zone containing a catalyst comprising iron, maintained at elevated temperature and under a pressure of about 200 pounds per square inch gauge. In Case I, a temperature of about 600° F. is maintained uniformly throughout the reaction zone, while in Case II the temperature in the region of initial contact between the feed gas and catalyst is maintained at about 550° F., and at about 600° F. in the region of final contact. In each case, about 99% of carbon monoxide in the synthesis gas is converted into higher molecular weight compounds.

In Case I, the feed passing to the reaction zone comprises 33 mols of carbon monoxide, 66 mols of hydrogen and 1 mol of carbon dioxide so that the ratio of mols of hydrogen to mols of carbon monoxide plus carbon dioxide is substantially in excess of 1. In Case II, the feed passing through to the reaction comprises 33 mols of carbon monoxide, 66 mols of hydrogen and 77 mols of carbon dioxide, so that the ratio of mols of hydrogen to mols of carbon monoxide plus carbon dioxide is about 0.6. A comparison of the net yields basis 100 mols of carbon monoxide converted is as follows:

| Products | 1 | 2 |
|---|---|---|
| $CO_2$ | 10 | 0 |
| $CH_4$ | 15 | 2 |
| $C_2$ plus heavier hydrocarbons | 75 | 98 |
| | 100 | 100 |

From the foregoing comparison it is apparent that the addition of a substantial volume of carbon dioxide to the feed gas and the maintaining of a temperature gradient throughout the reaction zone results in materially decreasing the net production of carbon dioxide and also the production of methane. At the same time, a very small increase in the yield of higher molecular weight hydrocarbons is secured.

Reference will now be made to the accompanying drawing which illustrates the manner in which the invention may be practiced.

Carbon monoxide and hydrogen at temperatures about 500 to 550° F. are conducted from a source not shown through a pipe 1 into a catalyst conduit 2, leading to the bottom of a reactor 3. Advantageously, the synthesis gas contains at least about 2 mols of hydrogen per mol of carbon monoxide and preferably is substantially free from water or is no more than saturated with water at the temperature of the synthesis reaction.

The reactor 3 comprises a vertical vessel containing a mass of powdered synthesis catalyst comprising iron powder.

The reactants rise through the catalyst powder with sufficient velocity to maintain the powder in a state of dense phase fluidization.

The upper portion of the reactor 3 is advantageously enlarged to provide a settling space 4 in the lower portion of which accumulates a body or head of catalyst powder.

The numeral 6 designates a filter element formed from a porous refractory material such as Alundum through the pores of which the gaseous and vaporous products of reaction pass while the catalyst powder is retained within the space 4.

The effluent stream of reaction mixture comprising carbon dioxide, unreacted carbon monoxide and hydrogen, hydrocarbons and water is conducted through a pipe 7 to an exchanger 8 wherein the stream is cooled to a temperature about 100 to 150° F. The cooled stream then flows through pipe 9 to a separator 10 wherein water and higher molecular weight hydrocarbons contained in the effluent are condensed leaving a gaseous fraction comprising carbon dioxide, unreacted carbon monoxide and hydrogen and hydrocarbons having from 1 to 5 carbon atoms per molecule.

Water may be drawn off through a pipe 11 while condensed hydrocarbons are drawn through a pipe 12. The gaseous fraction is conducted through a pipe 13 to an absorption tower 14 wherein it is subjected to countercurrent contact with a suitable scrubbing liquid such as ethanolamine under conditions effective to absorb carbon dioxide therefrom.

The scrubbing agent enriched with carbon dioxide is drawn off through a pipe 15 to a stripping tower 16 wherein the carbon dioxide is expelled from the scrubbing agent, the latter being returned through pipe 17 to the tower 14.

The expelled carbon dioxide is removed through pipe 18 through which it is returned to the reactor 3 as indicated.

A residual gas and light hydrocarbons are removed from the top of the absorption tower 14 through a pipe 19 and disposed of as desired.

Referring again to the reactor 3, provision is made for continuously removing from the upper portion thereof the catalyst powder through a conduit 20. From the conduit 20 the catalyst powder is discharged into a cooling tower 21. The cooling is advantageously effected therein by subjecting the catalyst powder to intimate contact with a finely dispersed liquid which is vaporizable under the conditions of temperature and pressure prevailing therein.

For example, when operating the reactor 3 to produce hydrocarbons as already described, the temperature within the reaction chamber advantageously ranges from about 550° F. at the bottom to 600° F. at the top, and the pressure is maintained at about 200 pounds per square inch gauge.

Thus, the catalyst powder passing into the tower 21 will be at a temperature about 600° F. and under pressure of about 200 pounds.

The cooling agent advantageously comprises a light hydrocarbon liquid such as pentane or a pentane-hexane fraction of saturated hydrocarbons. The pentane may be drawn initially from a source not shown through a pipe 22 by which it is injected through a suitable spray 23 located within the bottom portion of the cooling tower 21. If desired, a plurality of atomizing sprays may be employed at successive points along the vertical dimensions of the tower. Advantageously, the volume of vapor rising through the tower 21 is sufficient to maintain the catalyst powder in a fluidized state.

The effluent stream of hydrocarbon vapor escapes from the top of the tower through a filter element 24 similar to the element 6 in the reactor 3. The effluent hydrocarbon vapor stream then passes through a pipe 25 and the heat exchanger 26 wherein it is condensed. The condensed liquid is then returned through pipe 27 for reuse in the cooling tower 21.

A portion of the cooled catalyst powder at a temperature of about 500 to 550° F. accumulates behind the baffle 28 and lower portion of the tower 21 and is withdrawn therefrom through the conduit 29 which communicates with the previously-mentioned conduit 2.

The entering stream of carbon monoxide and hydrogen from the pipe 1 thus forces the cooled catalyst powder along the conduit 2 into the bottom of the reactor 3. The amount so drawn off and cooled in the tower 21 is adjusted so that upon its return through conduit 2 into the reactor the desired temperature conditions will prevail within the lower portion of the reactor 3.

As disclosed at the outset, it is contemplated maintaining the temperature in the lower portion of the reactor 3, that is, in the region of initial contact between synthesis feed gas and catalyst, at a temperature at least 10° F. lower than the temperature prevailing in the upper portion of the reactor and preferably in the case of an iron catalyst, this temperature is maintained at about 550° F. while the temperature in the upper portion of the reactor is maintained at about 600° F.

As indicated in the drawing, the reactor 3 is provided with an internal cooling element 31. This element may comprise a plurality of tubes 32 closed at their lower ends with their upper ends terminating in a chamber 33. Each tube 32 is provided with an inner concentric tube 34 open at its lower end and having its upper end terminating in a chamber 35. In operation, a suitable heat carrier fluid such as water is injected from a source not shown through pipe 36 into the chamber 35 from which it flows downwardly through the inner concentric tubes 34. This liquid then rises through the annular space between the outer surface of tubes 34 and the inner surface of the tubes 32, and in this way flows in indirect heat exchange relationship with the mixture of powdered catalyst and reactants surrounding tubes 34. The heat carrier fluid now at elevated temperature flows into the chamber 33 from which it is discharged through pipe 37.

By means of the exchanger element 31, the exothermic heat of the reaction is used to heat and vaporize the heat carrier fluid. When the fluid in question is water, the heat of reaction is thus used to generate steam.

As an alternative to removing and cooling a portion of the catalyst powder, and while still utilizing the cooling element 31, provision may be made for injecting vaporizable liquid in atomized form into the lower portion of the reaction vessel 3. Thus, the pentane may be passed through the pipe 38 for this purpose. In this type of operation, it is essential to choose a hydrocarbon or hydrocarbon fraction of proper volatility and to inject it in such a manner that it is completely vaporized without causing "mudding" of the catalyst which would otherwise destroy fluidization. This also applies with respect to the cooling of the catalyst powder in the tower 21.

Mention has already been made of discharging residual gas and light hydrocarbons through the pipe 19. This stream may be passed all or in part through a pipe 40 to a polymerization unit 41, indicated in broken lines. This unit may comprise conventional means for effecting polymerization, and in addition suitable cooling, separating and fractionating means.

A residual gas fraction may be obtained from the polymerization unit which will comprise carbon monoxide and hydrogen which issue as unreacted gas from the reactor 3. Accordingly, this carbon monoxide and hydrogen fraction is advantageously passed through a pipe 42 leading to a pipe 18 for return to the reactor 3. Instead of recycling it to the reactor 3, it may be passed to a succeeding or separate reactor.

In starting up the reactor, carbon dioxide may be drawn from an extraneous source not shown and continuously injected to the reactor along with fresh synthesis gas until a sufficient quantity of carbon dioxide has been accumulated from the effluent to permit continuous recycling thereof in the amount required to provide the molar ratio of hydrogen to carbon monoxide plus carbon dioxide passing into the reactor.

It is also contemplated that the invention is applicable to synthesis conversion processes wherein the catalyst is employed other than in a fluidized state, as for example in the form of a mass of beads or pellets descending through a reaction tower countercurrently to a rising stream of reactant gas.

It is also contemplated that other types of reactor apparatus may be employed; for example, instead of providing for continuous removal of a small amount of the catalyst powder from the upper portion of the reaction vessel, provision may be made for removing it from the lower portion as is customary in the so-called down flow type of fluidized catalyst operation.

It is also contemplated that the conversion may be carried out in separate stages; for example, the synthesis feed gas may be passed to a primary reactor maintained at the desired lower temperature, and the effluent stream from this reactor then passed to a secondary reactor maintained at a temperature of at least 50 to 100° F. higher than the temperature in the primary reactor, and which may be several hundred degrees higher than the primary reactor. Carbon dioxide is separated from the effluent stream in the secondary reactor and recycled to the primary reactor.

Thus conditions of temperature are maintained in the primary reactor such that the predominating reactions, assuming iron as the catalyst, are: 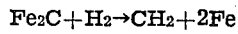 and $$Fe_2C + H_2 \rightarrow CH_2 + 2Fe$$

The higher temperature conditions prevailing in the secondary reactor are advantageous from the standpoint of favoring the reaction

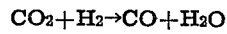

While specific reference has been made to employing a catalyst comprising iron, it is contemplated that other synthesis catalysts, comprising a metal or metals from the iron group of the periodic system, i. e., cobalt, nickel, ruthenium, etc. may be employed. The metal may be employed in association with a supporting or carrier material and also with suitable promoting agents, if desired.

An effective iron catalyst comprises iron powder of about 100 to 400 mesh containing about 2 to 3% of potassium oxide ($K_2O$) and alumina ($Al_2O_3$). Preferably all of the powder should pass through a 200 mesh screen and about 85% should pass through a 325 mesh screen.

Examples of other useful promoters are the oxides of thorium, magnesium, uranium and vanadium, while examples of supporting materials are diatomaceous earth, silica gel, Filtrols, etc.

Thus an example of a supported catalyst would be one comprising about 32% cobalt, 64% Filter Cel and about 4% thorium and magnesium oxides.

Certain temperatures have been specifically referred to in connection with the employment of an iron catalyst. However, it is contemplated that other temperatures may be employed, depending upon the type of catalyst used, such temperatures ranging from about 200 to 700 F.

With a cobalt catalyst, for example, an effective temperature is in the range 365 to 410° F. In any case, it is contemplated maintaining the temperature in the primary stage or at the point of initial contact between feed gas and catalyst at a temperature substantially lower than in the final stage or point of contact between reactants and catalysts.

Obviously many modifications and variations of the invention as above set forth may be made without departing from the spirit and scope thereof, and therefore only such limitations should be imposed as are indicated in the appended claims.

I claim:
1. In the catalytic hydrogenation of carbon monoxide to produce hydrocarbons, oxygenated hydrocarbons and mixtures thereof wherein a synthesis gas stream comprising carbon monoxide and hydrogen in the relative proportions of at least about 2 mols of hydrogen for each mol of carbon monoxide is passed in contact with a mass of powdered iron catalyst at predetermined conditions of temperature within the range of about 500 to 700° F. and under a pressure of about 200 lbs. per sq. in. gauge, said catalyst being maintained in a condition of dense phase fluidization in indirect heat exchange relationship with a fluid heat carrier within a reaction zone effective to maintain said predetermined temperature conditions, the method comprising effecting initial contact between said synthesis gas stream and the catalyst at a temperature of about 550° F., effecting final contact between reactants and catalyst at a temperature of about 600° F., and adding carbon dioxide to the reactant stream in amounts such that the ratio of mols of hydrogen to the sum of the mols of carbon dioxide and carbon monoxide passing to the reaction zone is about 0.6 and such that net production of carbon dioxide from the reaction zone is substantially inhibited and the production of methane is at least materially reduced.

2. In the catalytic hydrogenation of carbon monoxide to produce hydrocarbons, oxygenated hydrocarbons and mixtures thereof wherein a synthesis gas stream comprising carbon monoxide and hydrogen in the relative proportions of at least about 2 mols of hydrogen for each mol of carbon monoxide is passed in contact with a mass of solid particulate synthesis catalyst at predetermined conditions of temperature within the range about 500 to 700° F. and under superatmospheric pressure, said catalyst comprising iron maintained in a condition of dense phase fluidization in heat exchange relationship with a fluid heat carrier within the reaction zone effective to maintain said predetermined temperature conditions, the method comprising effecting initial contact between said synthesis gas stream and the catalyst at a temperature within the range about 10 to 100° F. lower than the temperature of final contact between reactants and catalyst, and adding carbon dioxide to the reactant stream in amounts such that the ratio of mols of hydrogen to the sum of the mols of carbon dioxide and carbon monoxide passing to the reaction zone is in the range of about 0.6 to 1.0 and such that net production of carbon dioxide from the reaction zone is substantially inhibited and the production of methane is at least materially reduced.

3. The method according to claim 2 in which the initial contact between synthesis gas stream and catalyst is at a temperature of about 50 to 100° F. lower than the final contact temperature between reactants and catalyst.

CLAUDE W. WATSON.

REFERENCES CITED

The following references are of record in the file of this patent:

UNITED STATES PATENTS

| Number | Name | Date |
|---|---|---|
| 2,248,099 | Linckh | July 8, 1941 |
| 2,338,805 | Dreyfus | Jan. 11, 1944 |
| 2,347,682 | Gunness | May 2, 1944 |
| 2,353,600 | Sweetser | July 11, 1944 |
| 2,393,909 | Johnson | Jan. 29, 1946 |
| 2,406,851 | Redcay | Sept. 3, 1946 |